United States Patent [19]

Rutkowski et al.

[11] 3,775,565

[45] Nov. 27, 1973

[54] CIRCUIT ARRANGEMENT FOR CENTRALLY CONTROLLED TELEPHONE EXCHANGE INSTALLATIONS

[76] Inventors: Karl Rutkowski, Pullach; Klaus Kunert, Germering, both of Germany

[22] Filed: May 24, 1971

[21] Appl. No.: 146,292

Related U.S. Application Data

[63] Continuation-in-part of Ser. No. 780,414, Dec. 2, 1968, abandoned.

[30] Foreign Application Priority Data

Dec. 1, 1967 Austria ............................ 10,887/67

[52] U.S. Cl. ............................................ 179/18 ES

[51] Int. Cl. ............................................ H04q 3/54

[58] Field of Search .................. 179/15 AL, 18 EA, 179/18 FC, 18 ES

[56] References Cited

UNITED STATES PATENTS

| | | | |
|---|---|---|---|
| 3,639,904 | 2/1972 | Arulpragasam | 179/15 AL |
| 3,524,940 | 8/1970 | Edstrom | 179/18 EA |
| 2,986,602 | 5/1961 | Tubinis | 179/15 AL |
| 3,409,877 | 11/1968 | Alterman et al. | 179/18 EA |

*Primary Examiner*—Thomas W. Brown
*Attorney*—Birch, Swindler, McKie & Beckett

[57] ABSTRACT

A circuit arrangement for centrally controlled long distance telephone exchange installations, wherein central information transmission circuits are provided between central control means and centrally controlled individual apparatus. The latter may, for example, comprise internal connection sets, long distance line repeaters, exchange office repeaters in subscriber installations with extension stations, registers, dial receivers and the like in which connections of the centrally controlled individual apparatuses to the information transmission circuits are jointly controlled. In the centrally controlled exchange installation, there is provided between the central control mechanism and the centrally controlled individual apparatus, at the location of the latter, a common connection mechanism which receives connection commands through the address informaton from the central control mechanism. The common connection mechanism controls the connection of the individual apparatus to information lines over connection circuits.

3 Claims, 7 Drawing Figures

Fig.Ib
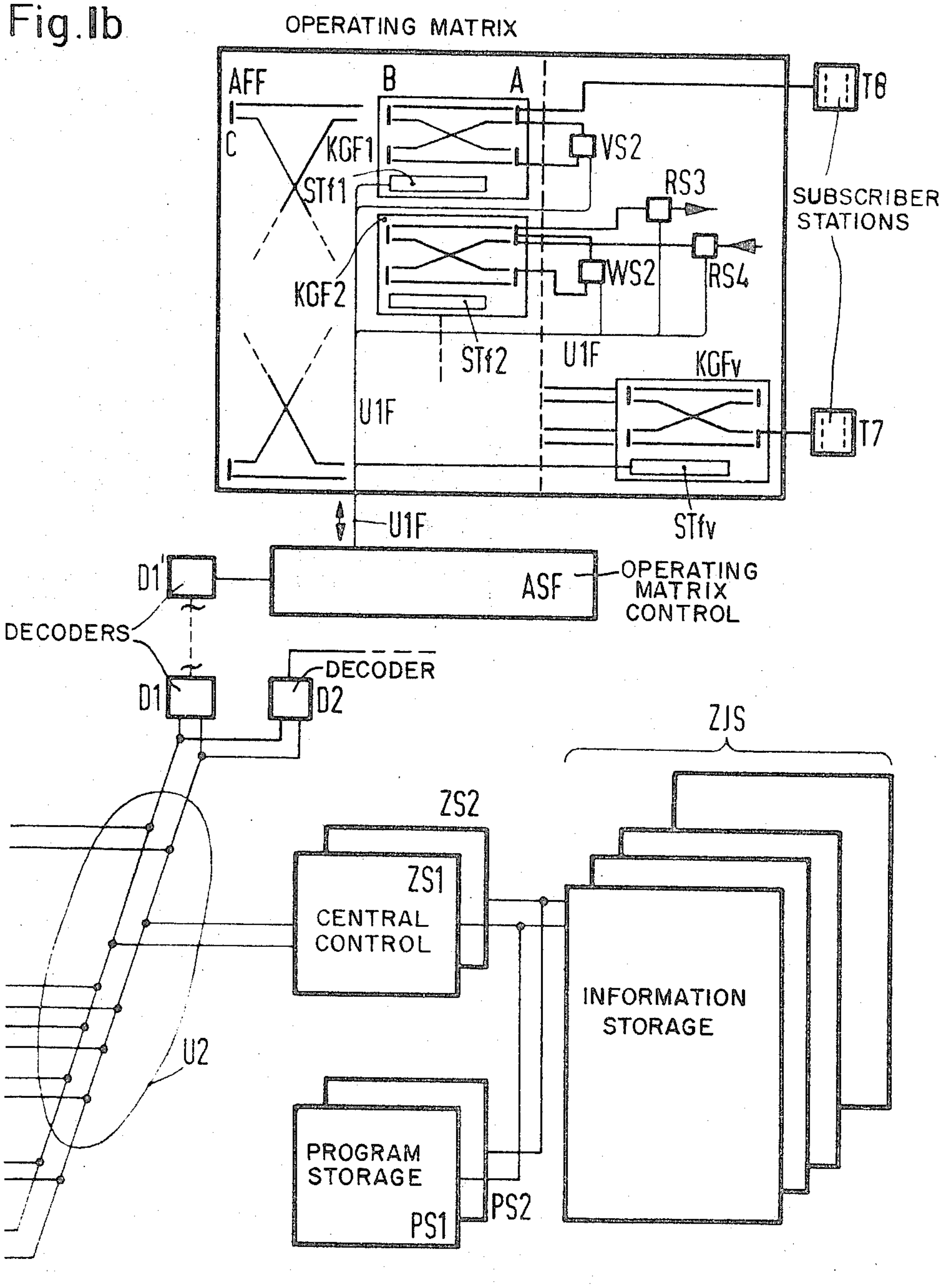

CIRCUIT ARRANGEMENT FOR CENTRALLY CONTROLLED TELEPHONE EXCHANGE INSTALLATIONS

CROSS REFERENCE TO RELATED APPLICATION

This application is a continuation in part of a co-pending application, Ser. No. 780,414, filed Dec. 2, 1968, now abandoned.

BACKGROUND OF THE INVENTION

Field of the Invention

The invention relates to a circuit arrangement for centrally controlled telecommunication installations, in particular, telephone exchange installations, wherein central information transmission circuits are provided between central control means and centrally controlled individual apparatus. The latter may, for example, comprise internal connection sets, long distance line repeaters, exchange office repeaters in subscriber installations with extension stations, registers, dial receivers and the like in which the connection of the centrally controlled individual apparatuses to the information transmission circuits is jointly controlled. The invention may be applied to public telephone exchange centrals, as well as private branch exchanges. Additional applications would include teleprinter exchange installations.

2. Description of the Prior Art

Recently, many exchange installations with central controlling have become known in the telephone art. A common control means is assigned to a plurality of individual apparatus, such as connection sets for internal and external connections, dial receivers, registers, setting means for switching matrices or parts thereof and the like. The common control means exchanges information with the individual apparatus and processes the logical information for the latter. Due to centralization of the logical functions of an exchange installation, the total cost thereof can be reduced. Also, in exchange installations of this kind, changes in the mode of operation can very advantageously be made because appropriate circuit changes need only be made at the central location.

Aside from the time multiplex principle, it is known for such centrally controlled telephone exchange installations to connect a single one of the plurality of individual apparatuses, at any point in time, for the duration of a completed functional program to the central control means. The individual apparatuses which must be connected with the central control means for the carrying out of some kind of control programs are therefore each connected thereto for a short time in succession. This principle is also designated the "one-at-a-time" principle. Understandably, this connection is most suitably controlled by the central control means. It, therefore, is suggested to also assign the connecting devices, such as connection relays or gate circuits, to the central control means. Individual assigned information circuits are connected between such connection devices of the central control means corresponding to the individual apparatus and the latter. Thus, the information circuits form a star-network, the center whereof comprises the central control means. This star-network is the prerequisite for the mentioned connection at a central location which is advantageous for the reason that the connection commands are, also, formed there.

As compared to this, it is, also, known to provide a series connection between individual members for the transmission of the information to be exchanged with the central control unit. The terminals at each end of this series line are connected to the central control means so that it may, also, be referred to as a ring line looped to all individual members. Such a ring line makes it possible, due to its path, to considerably lower the required costs for the information line. This is of special importance when central control means and individual apparatus are located at a distance from one another and the number of individual apparatuses is large. However, such a ring line requires that the connection devices for the connection of the individual apparatuses to the central control means must be located with the individual apparatus. This, in turn, creates problems for the carrying out of the connecting and disconnecting processes.

Two basic possibilities exist. On one hand, connection circuits can extend from the central control means to all individual apparatuses, over which the connection devices thereof are controlled. It is also possible, on the other hand, to assign address receivers to the individual apparatuses and to control the connection from the central control means, thereby, such that in each case an address corresponding to the individual apparatus to be connected is transmitted over the information ring line. Then the address receiver in question causes the connection means of the individual apparatus in each case to connect the information transmission and receiving switching devices, thereof, to the information ring line. The first of the two described possibilities causes the disadvantageous cost of connecting circuits which must all proceed from all individual apparatuses to the central control means. The second possibility necessitates, also to disadvantage, the use of an address receiver for each individual apparatus. Thus, both possibilities have the disadvantage of requiring an undesirably high cost.

Therefore, the problem is presented, in particular when considering the possibility that the central control means and the centrally controlled individual apparatuses are not located near each other, to develop the information exchange between the central control means and the centrally controlled individual apparatuses with regard to the circuitry expenditures associated with the central control means, the centrally controlled individual apparatuses, and the information lines as favorably as possible.

SUMMARY OF THE INVENTION

The aforementioned problem is solved according to the invention through the fact that the information transmission circuits proceed over a connection control common to the centrally controlled individual apparatuses spatially assigned thereto, and that to that segment of the last two information transmission circuits proceeding between the central control means and the connection control, transmission and/or receiving switching devices are also assigned for addresses of centrally controlled individual apparatuses in addition to those for information. Thereby, there are jointly transmittable over the segment of the information transmission circuits proceeding between the central control means and the connection control, information along with an address of that centrally controlled individual apparatus from which, or to which, the information in each case is being transmitted. However, over the segment of the information transmission circuits between the connection control and the centrally controlled individual apparatus developed as series connected line or ring line, only the information is transmittable. Further, from the connection control corresponding to the transmitted address, the connection of the centrally controlled individual apparatus to the information transmission circuits is controlled over connection circuits which proceed only between the connection control and the centrally controlled individual apparatus.

Thus, according to the invention, the information transmission circuits are divided into two segments. One segment proceeds between all centrally controlled individual apparatuses and the connection control. Due to the development of this segment as a ring line, its advantage resides in the reduction in cost as compared to a star-network of information transmission circuits. However, neither individual address receivers for each centrally controlled individual apparatus, nor connection circuits leading from all centrally controlled individual apparatuses to the central control means are required. Moreover, connection circuits proceed from the individual apparatus only to the connection control spatially assigned thereto. This contains, just as the central control means, address transmission and receiving switching devices.

Thus, the expenditures in the central control means and the centrally controlled individual apparatuses are low. The central control means does not have connection circuits for all centrally controlled individual apparatuses, and the latter does not have address receivers individual thereto. Thereby, on one hand, the connection circuits proceed over the shortest possible paths and, on the other hand, the address transmission and receiving switching devices for the many centrally controlled individual apparatuses are arranged in centralized fashion in the connection control. Through a combination of the principles "address approach control" and "approach control over connection circuits", the total cost becomes most favorable through the invention.

According to a further development of the invention, the connection control contains information storage means for information to be transmitted from the centrally controlled individual apparatuses to the central control means and vice versa. It is, thereby, possible to adapt the information transmission on the segment of the information transmission circuits proceeding between the central control means and the connection control to the relatively high operational speed of the central control means, and the information transmission on the segment of the information transmission circuits proceeding between the connection control and the centrally controlled individual apparatuses to the relatively low operational speed of the latter. This has a very advantageous effect on the operational speed of the central control means which is determined by the sum of the time periods required for information receipt, logical information e1 and information transmission, with which, as is known, its operational capacity is basically associated.

According to a further development of the invention, several spatially combined groups of centrally controlled individual apparatuses are formed with one individual connection control each, which are connected to a common central control means. It is possible, thereby, to combine the centrally controlled individual apparatus into groups, corresponding to narrowly defined local areas, within which the information transmission circuits have only very small dimensions as compared to that segment of the information transmission circuits which proceeds in each case between the assigned connection control and the central control means. As the addresses of the centrally controlled individual apparatuses are transmitted in a manner similar to information transmission and jointly therewith, data transmission apparatus can be inserted into this segment, so that the centrally controlled individual apparatuses of a group can also be operated by remote control. The above mentioned connection circuits proceeding to the centrally controlled individual apparatuses extend only over the shortest distances, for example, a row of frames in a telephone exchange installation.

BRIEF DESCRIPTION OF THE DRAWINGS

FIGS. 1*a* and 1*b* are block diagrams of a telephone exchange according to the invention, which should be viewed with FIG. 1*a* on the left;

DETAILED DESCRIPTION OF THE INVENTION

Figure 3:
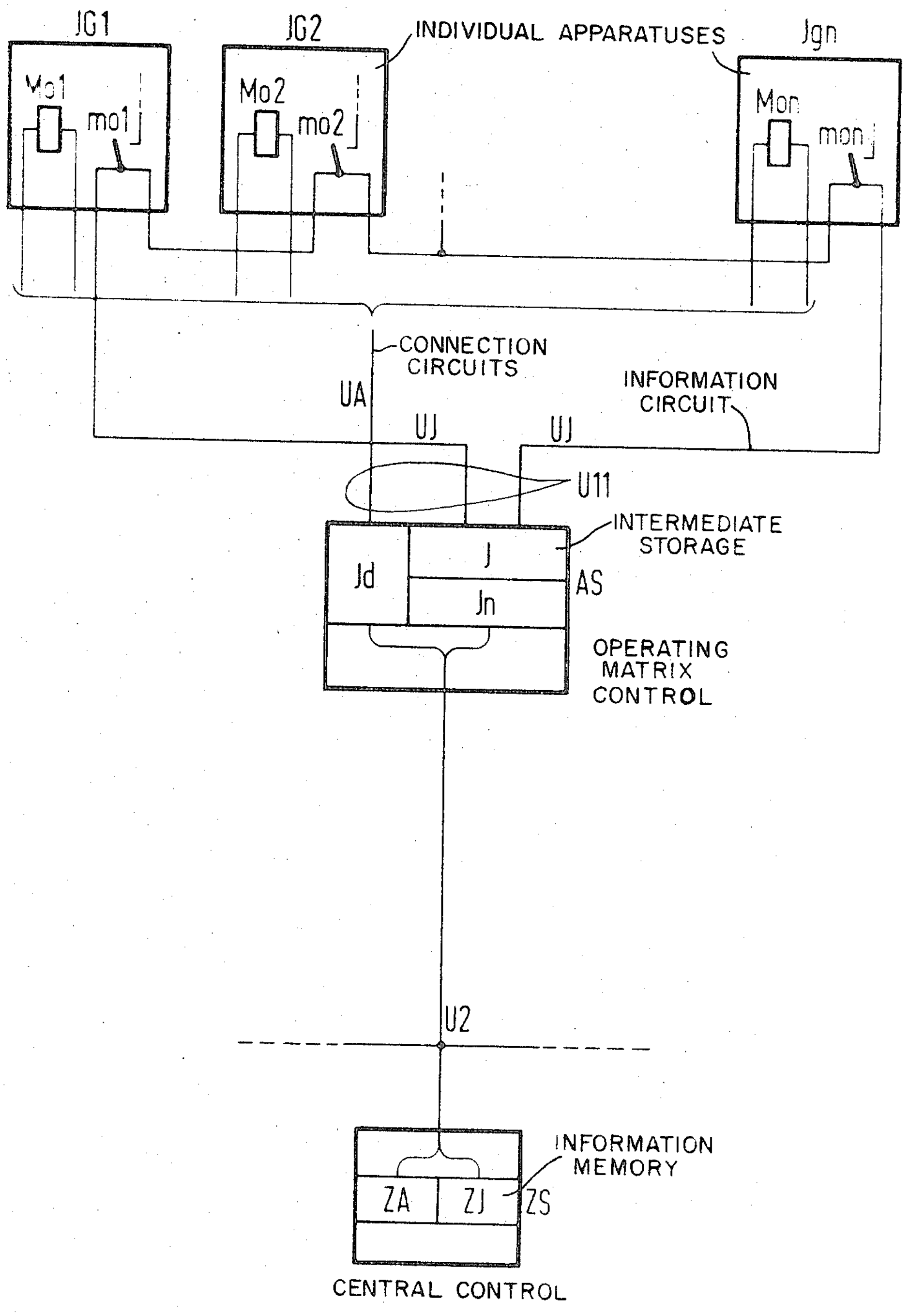
FIG. 3 shows in a block diagram form a telephone exchange installation of which further details are given in FIG. 1 and FIG. 2.

FIG. 3 shows central control unit ZS connected by segment U2 of the information transmission circuit to connection control AS. Segment U2 of the information transmission circuit is subsequently always designated as a transmission line of the second type and connection control AS as an operating matrix control means. The latter (AS) is assigned to a group of centrally controlled individual apparatuses JG1 to JGn and is connected thereto over a transmission line U11 of a first type. Transmission line U11 consists of circuits UJ which are only for information transmission, and connection circuits UA which will be described in more detail below. Circuits UJ represent that segment of the information transmission circuits mentioned in the above summary of the invention which proceeds from all centrally controlled individual apparatuses to the thereto assigned operating matrix control means (previously termed the connection control). Information transmission circuits UJ of transmission line U11 form a ring line emanating from operating matrix control means As, which is looped through all individual apparatuses JG1 to JGn, and is then returned back to the operating matrix control means AS.

If instead of a ring line, a series line is used, the described is unnecessary. In the case of a ring line, breaking of the wire cannot be detected; however, it can be detected in the case of a "looped line." "Ring line" is a fixed definition and may be described as having a beginning and end at a common point. In addition to this ring line, connection circuits UA are assigned which are connected from operating matrix control means AS to all centrally controlled individual apparatuses JG1 to JGn. It is possible to connect one circuit each from operating matrix control means As to each centrally controlled individual apparatus, over which the connection relays Mo through Mon, thereof, can be excited by the operating matrix control means AS. However, it is also possible to device connection circuits UA into two groups and to effect the connection of a centrally controlled individual apparatus through actuation of one circuit each of these two groups.

Thus, it can be seen that the circuits for the transmission of information between the centrally controlled individual apparatus subsequently referred to as individual apparatus and the central control unit proceed over the operating matrix control means. That segment which proceeds between the individual apparatus and the operating matrix control means is only for the transmission of information. However, the segment which proceeds between the operating matrix control means and the central control unit is for the joint transmission of information and addresses of individual apparatuses from which, or to which, information is transmitted. In the information transmission from the central control unit to an individual apparatus an address is sent before the transmitted information on transmission line U2, which is received by the operating matrix control means AS with the aid of identification means Jd and which leads, over one of circuits Ua, to the connection of the individual apparatus in question. The information which directly follows the address is received in operating matrix control means AS with the aid of receiving and transmitting system Jn, and conveyed to intermediate storage means J. As soon as the connection of the individual apparatus to the information transmission circuit UJ of transmission line U11 has taken place, the information in question is transmitted over information transmission circuits UJ to the individual apparatus.

The central control unit ZS contains, just as the operating matrix control means AS (Jd, Jn), transmission as well as receiving switching devices for addresses (ZA) of individual apparatus and for information (ZJ).

Figure 5:
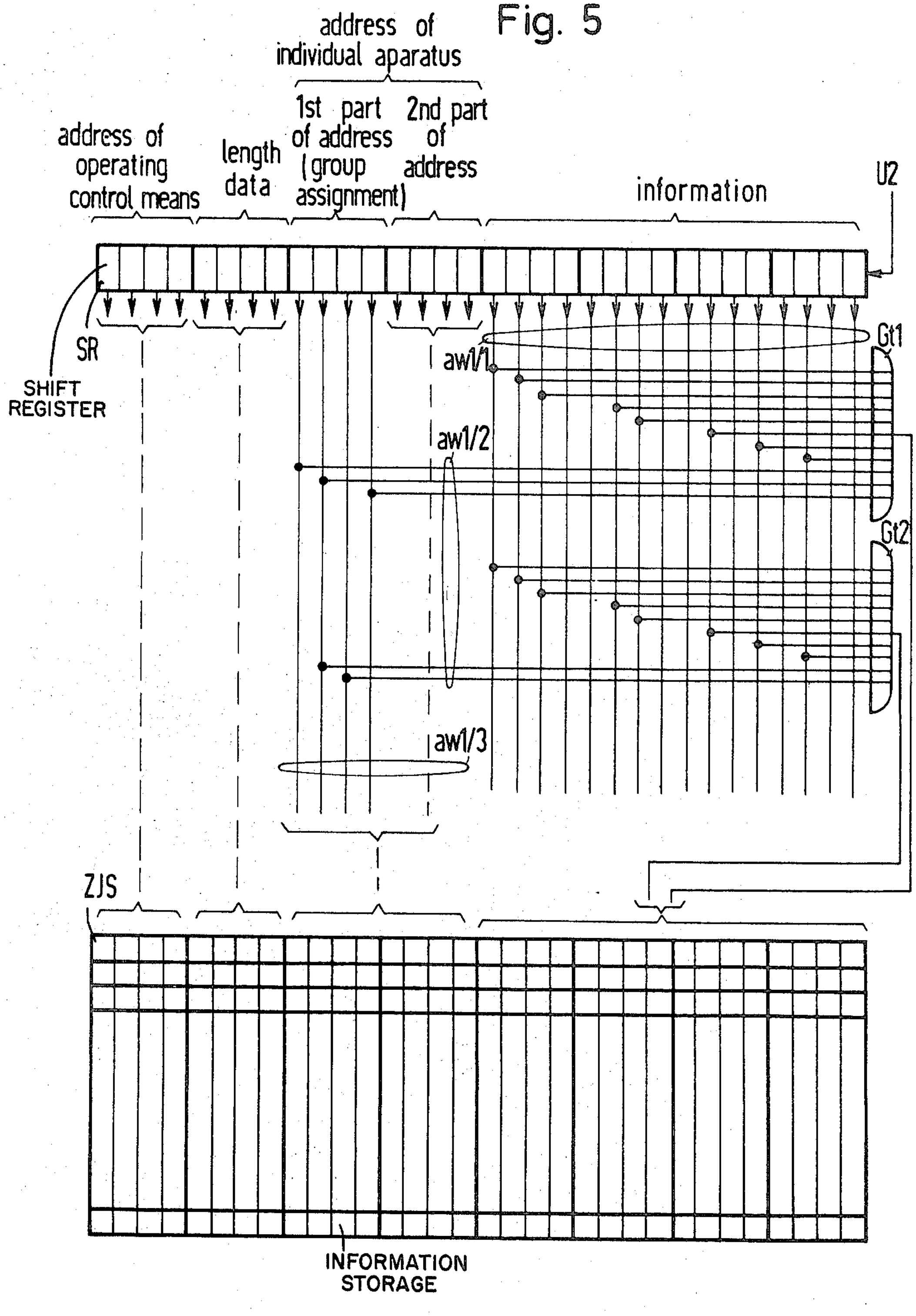
FIG. 5 is a diagrammatic representation of the major elements of the central control unit in the FIG. 1 embodiment.

The central control device ZS1 is represented in further detail in FIG. 5, and is described only insofar as further description will contribute to a better understanding of the invention. Insofar as further structural or operating details are required reference may be had to the November, 1958 issue of *Bell System Technical Journal*, pages 1342 – 1382, and the Sept., 1964 issue of the same publication at pages 2055 – 2096.

The information received in the central control device over the transmission line of the second type U2 are, as will be explained in further detail below, supplemented by a length indication and an address of the given individual apparatus. Each information in conjunction with the length indication and the address will then be received in a shift register and further supplemented by a prefixed address of the pertinent operating matrix control device. The address of the pertinent individual apparatus prefixed to each information is comprised of two parts. A first part contains an indication of the special type of the given individual apparatus, i.e., about the special address group. A second part contains, for example, the number identifying the given individual apparatus within this group. The information received in the shift register SR of the central control device ZS1, together with the length indication and address of the individual apparatus, will be, thereafter, routed to the central information memory (information storage) ZJS, which has a number of memory rows, shown horizonally in FIG. 5, and indeed, a memory row is available for each information to be stored. The central information memory ZJS is sub-divided in a plurality of sections corresponding to the component parts explained above in detail (address of the operating matrix control device, length indication, address of the individual apparatus in two parts, information in four parts) in the same way as is the shift register SR.

With the transfer of information contained in the shift register SR along with addresses and length indication to the central information memory ZJS, one part of the address of the individual apparatus, and indeed, that part which designates the address group, or which characterizes its special type, will be evaluated therewith, for deriving the pertinent information. FIG. 3 shows that two identical data signals given off by the shift register SR arrive at different individual apparatuses as distinguishable data signals over the output of the coincidence gates Gt1 and Gt2 at the central information memory ZJS, because of different addresses of their type.

Figure 1A:
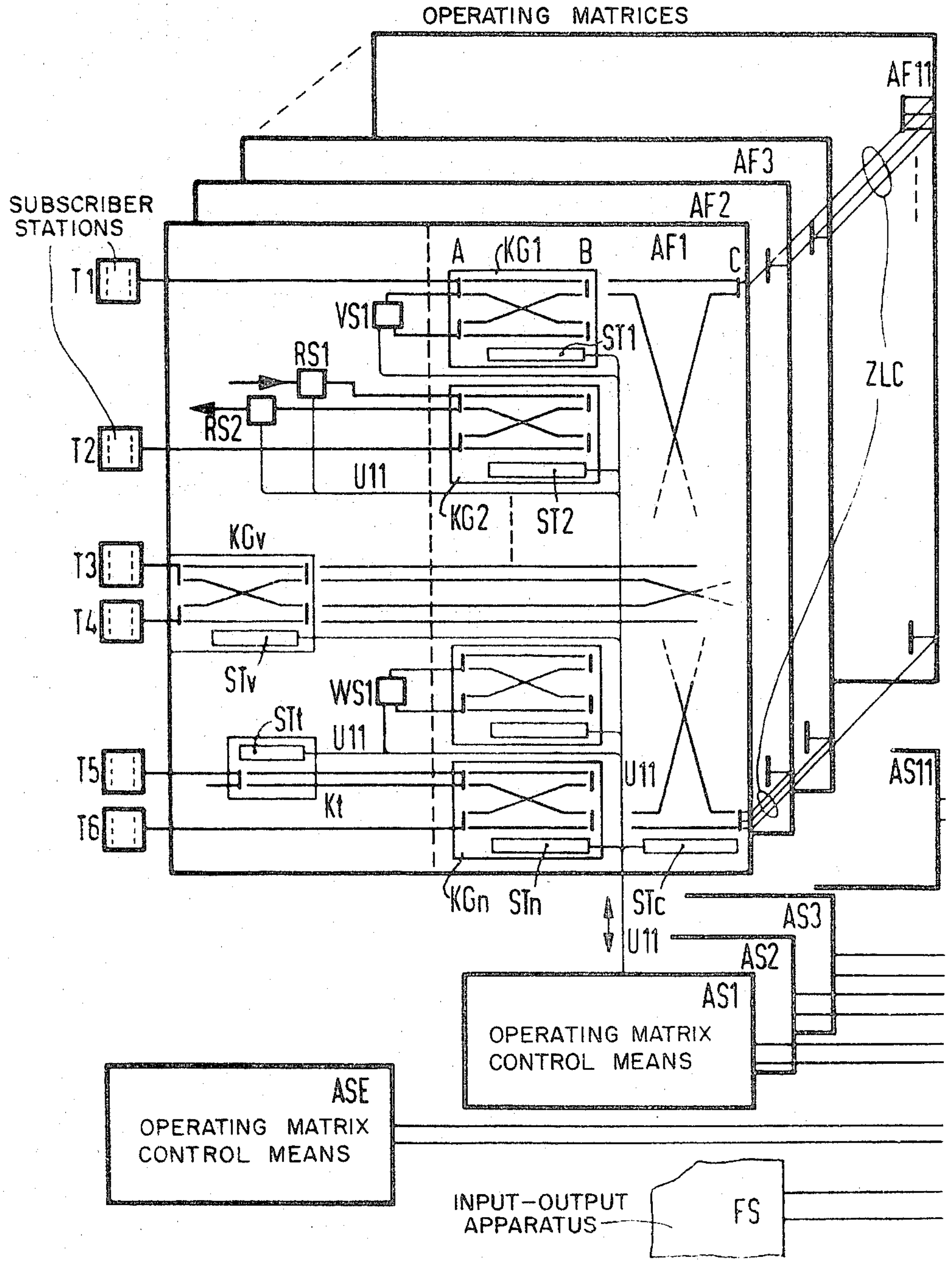
Figure 2:
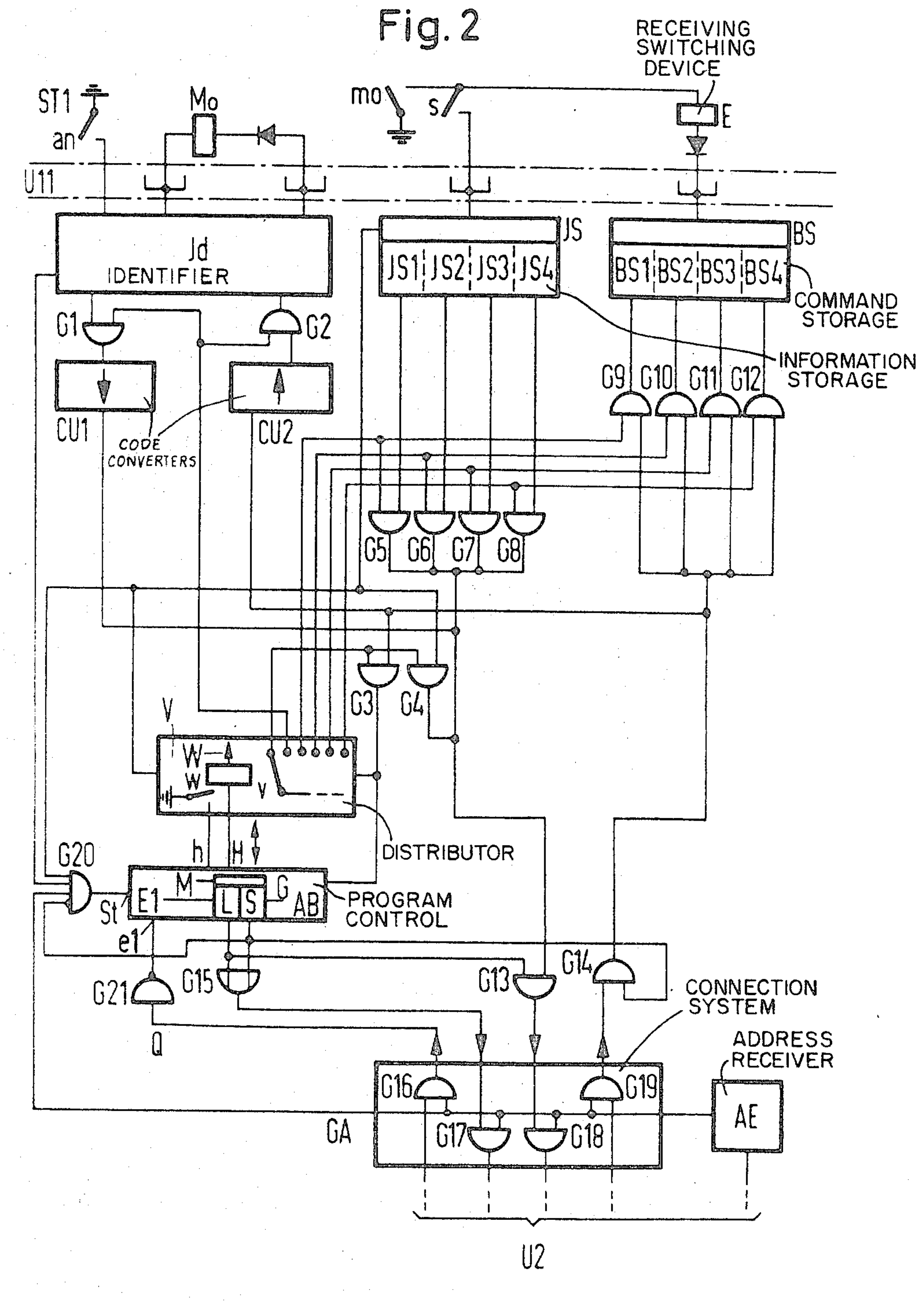
FIG. 2 is a circuit diagram in which the operating matrix control means of FIG. 1 is shown in greater detail.

Preparatory to a more detailed description of the telephone exchange installation shown as a working example of the invention in FIGS. 1 and 2, which will follow, a few corresponding facts between the definitions used in FIG. 3, and those shown in FIGS. 1 and 2, shall be pointed out. To connection relays Mol to Mon in FIG. 3, corresponds connection relay Mo in FIG. 2. To storage means J in FIG. 3, corresponds storage means JS and BS in FIG. 2. The circuits designated in FIG. 3 by UJ, which are exclusively for the transmission of information, correspond in FIG. 2, to those circuits which all proceed between contact s and storage means JS, and relay E and storage means BS. The circuits designated by UA in FIG. 3, which are for the controlling of the connection of the individual apparatus to the information transmission circuits UJ, correspond to those circuits of the transmission line U11 of the first type in FIG. 1, which proceed to identification means Jd. The remaining corresponding designations between the block switching diagram in FIG. 3, and the more detailed illustrations in FIGS. 1 and 2, are obvious and are, for this reason, not explained in further detail.

FIG. 1 shows a telephone exchange installation according to the invention having a plurality of groups of individual apparatuses comprising operating matrices AF1...AF11, and AFF which are part of a larger exchange installation. Each operating matrix comprises a group of spatially combined individual apparatuses having assigned joint operating matrix control means. Such a group of individual apparatus is, for example, also represented by individual apparatus JG1 to JGm in FIG. 3. Intermediate storage and recording systems AS1...AS11 comprise operating matrix control means for operating matrices AF1...AF11, respectively. Analogously, operating matrix control ASF is assigned to operating matrix AFF. All of the operating matrix controls are of uniform construction. The operating matrix control means AS1...AS11 of the exchange installation are connected by transmission lines U2 of the second type with first and second central control means ZS1 and ZS2, respectively. The arrangement of the two central control means serves, in known manner, to increase the operational reliability of the entire exchange installation with regard to the possibility of a misfunction or an interruption of the operation of a central control means. It also functions to supervise errors by comparing two informations supplied independently of one another by the two different central control means. As this is not essential for understanding of the invention, a single central control means is usually discussed hereafter.

Data transmission lines of the U2 type connect distant operating matrix control means, such as ASF, with the central control means Z1, Z2, for exchange of information therewith. Conventional data transmitting and receiving equipment may be interposed in the transmission line, if needed.

The operating matrices each comprise, *inter alia*, coupling stages A and B of the three-stage switching matrix having coupling groups consisting of individual coordinate couplers, for example KG1 to KGn in the instance of operating matrix AF1 and KGF1, KGF2..., in the instance of distant operating matrix AFF. To each coupling group an individual control means, for example ST1 in the instance of coupling group KG1, is assigned, which carries out the setting orders received from the operating matrix control means. In each case one coupling group and its assigned individual control means constitutes an individual apparatus. Further, the entirety of the couplers of coupling stage C with its control means STc are individual apparatus.

It is also possible to combine these couplers in an operating matrix in several individual apparatus having individual control means. Further, connection sets, for example VS1 for connections to be switched-through within the exchange installation consisting of operating matrices AF1 to AF11, are individual apparatus. Relay sets, for example RS1 and RS2, are individually assigned by connection lines (local and long distance lines) to exchange installations at other locations for arriving and/or departing connections. The individual apparatus also includes dial receivers, for example WS1, which serve subscribers for reception of dial information signals; preferred coupling groups, for example KGv having individual control means STv; and preferred one-stage couplers, for example Kt, having individual control means STt. These preferred coupling groups and one-stage couplers are of an importance which corresponds to the larger and smaller dial star switches known in customary exchange installations. Moreover, not shown subscriber-individual subscriber connection circuits can be arranged as individual apparatus or in groups.

All of these individual apparatuses of an operating matrix for example AF1 are connected, over a network of transmission lines of the first type, for example U11, with the operating matrix control means in question, for example AS1. Each individual apparatus contains connection devices which are controllable by the operating matrix control means. For this, if the requirement for a connection exists in the individual apparatus, a connection impulse is given therefrom to the identified operating matrix control means which leads to the transmission of an order to effect connection to the individual apparatus in question.

The coupling switching devices of several operating matrices in one location form a single common switching matrix, which is divided, only for reasons which have no causal connection with the grouping of the switching matrix (for example reliability, expansion possibilities, and questions of traffic load) into several applicability areas having several operating matrix control means.

The switching matrix formed from the coupling switching devices in coupling stages A, B and C of operating matrices AF1 to AF11 corresponds in its development to that which is the principal object of British Patent No. 1,058,893. This switching matrix as shown therein is developed of couplers in several (preferably three) coupling stages, connected over intermediate lines to the inputs of the first coupling stage. Subscriber lines, connection lines and all inputs and outputs of switching devices necessary for connection establishment and connection supervision for each connection, are similarly connected. Outputs of the couplers of the first until the next to the last coupling stage which are connected individually to the inputs of the couplers of the coupling stage switched subsequently in each case, are connectable in each case in pairs in this subsequent coupling stage. Such a switching matrix is shown and described in British Patent No. 1,058,893.

The special characteristic of the development of such a known switching matrix resides, according to the above identified British Patent, in the fact that from one switching matrix input the outputs of each of the couplers can be reached over one single connection path at the most. Thereby during pathfinding from the direction of a switching matrix input, through selection of one of these outputs, the path to be switched through over the switching matrix for the desired connection is already clearly fixed. The switching matrix, viewed from its inputs to the outputs of its couplers, is developed in purely fan-shaped fashion. Nevertheless, two switching matrix inputs can alternatively be connected over different paths because there are always accessible, from the direction of the two switching matrix inputs, several common coupler outputs, or several times two coupler outputs each, pertaining to the last coupling stage in different operating matrices and connected over one intermediate line each.

The operating matrices, for example AF1, thus possess three coupling stages each, the couplers whereof are connected over intermediate lines in such a way that to one coupler output each in the first to the next to the last coupling stage A and B, one coupler input each in the second to the last coupling stage B and C is individually fixedly assigned. The outputs of the couplers of the coupling stage C in all operating matrices AF1 to AF11 and AFF are at least partially disconnected. In operating matrices AF1 to AF11 a part of these outputs is individually connected in pairs over intermediate lines ZLC leading from one operating matrix to another.

To the two central control means ZS1 and ZS2 arranged next to each other there are respectively assigned program storage means PS1 and PS2. The central control means read from the program storage means according to which program comprising information transmitted by an operating matrix control means to be processed is received in the central control means. In addition, a common multi-part information storage means ZJS is assigned to the two central control means, the entire storage capacity whereof is available to the two central control means according to the needs in each case.

To the network of transmission lines U2 there is assigned control apparatus FS for the input and output of information by which central control means ZS1 and ZS2 can be reached directly. It is possible through control apparatus FS to check the mode of functioning of the central control means and change the storage contents of program storage means PS1 and PS2 (take out of storage and/or store). Apparatus FS may be any one of the known means for communicating with a computer, for example, a teleprinter.

There is further assigned to the network of transmission lines U2 an operating matrix control mechanism ASE, which, in case of a disturbance in one of the operating matrix control means AS1 to AS2, can be connected temporarily thereto as a substitute for it. Thus, the operating matrix control means are uniform among one another and can be exchanged for one another. Thus, it is obvious that mechanism ASE is structurally similar to control means AF1 and AF2.

FIG. 2 gives further details of an operating matrix control means (AS1) shown in FIG. 1. The operating matrix control means is in connection, over transmission lines of the first type, for example U11, with individual apparatus, for example control system ST1 of coupling group KG1, and over transmission lines of the second type (U2) with the central control means shown in FIG. 1. The operating matrix control means can be requested by individual members, for example coupling group control ST1. With the aid of identification device Jd, the operating matrix control means is in a position to select one from several simultaneously present connection impulses, which are actuated over request contacts such as an, and transmit a corresponding order to connect to the connection relay Mo which corresponds to the connection impulse in question.

The request circuits are connected individually to the operating matrix control means from each individual apparatus. However, it is also possible to provide request contacts such as an of the individual apparatus ST1 in a coordinate matrix. Thereby the number of request circuits can be reduced substantially and, in the most favorable instance, to twice the square root of the number of individual apparatus served by an operating matrix control means. The connection relays such as Mo of the individual apparatus are located in a control matrix extending over all individual apparatus.

With the aid of contact mo of connection relay Mo, transmission switching device s and receiving switching device E of switching matrix control means ST1 are switched effective. It is pointed out that there are a plurality of transmission switching device S and receiving switching device E of coupling group control means ST1, and that information applied to and from the latter is transmitted over transmission line U11 under a parallel code. This means that the transmission lines connected to transmission switching device *s* and receiving switching device E are of a multiconductor type. The entire information to be transmitted in each case simultaneously lies at the conductors of multiconductor transmission line U11.

The transmission lines of the first type, for example U11, do not extend over long distances. Further, relatively inexpensive transmission and receiving switching devices can be inserted because these, utilizing the parallel code transmission method, fully satisfy the speed requirements for the information transmission. Therefore the relatively large number of circuits of the transmission lines of the first type, as well as the transmission and receiving switching devices for connection and transmission, does not present unfavorably high switching and other technical expenses. In the present case the receiving and transmitting switching devices comprise electromagnetic relays, or contacts thereof. However, it is also possible to substitute other equivalent switching devices therefor.

Preparatory to the description of the mode of operation of the operating matrix control means some definitions of terms will be given. As already evident from the above explanation, information is transmitted from the individual apparatus to the central control means, as well as from the central control means to the individual apparatus. In any case, the operating matrix control means serves as an intermediate member. Information transmission from one individual member to the central control means is subsequently always designated as "reading." The reverse information transmission from the central control means to an individual apparatus is always designated as "writing." Accordingly, the criteria "reading" and "writing" are formed in the operating matrix control means.

The criterion "reading" is always formed in the operating matrix control means if a request by an individual member, for example coupling group control means ST1, is present over request contact an and if all switching processes of preceding functional programs are terminated. However, if no such request by an individual member is present, the criterion "writing" is formed in the operating matrix control means which expresses the readiness of the operating matrix control means to receive information which may be present in the central control means and is to be transmitted to the said operating matrix control means.

Moreover, it can also be the case that neither a request by an individual member is present that the operating matrix control means is ready to receive information. This operational state exists in the case when an operating matrix control means has not yet completed processing certain information. The operating matrix control means is thus not ready for any kind of information exchange with the central control means. The criterion "block" is then formed in the operating matrix control means.

As is evident from FIG. 1, and as has already been described, two central control means are provided. Accordingly transmission lines of the second type such as U2 are also provided in duplicate. Further, systems and circuits which serve to transmit information are also in part provided twofold in the operating matrix control means. For reasons of simplicity this is not shown in FIG. 2. Further, at different locations comparison arrangements (not shown) are provided. It is thereby possible to supervise the accuracy of information transmission and processing. Furthermore it can be assured, in simple manner, that upon the occurrence of a disturbance at any point of the central information transmission paths, operation of the exchange installation can still be continued. As these advantages of duplicating central parts are known per se, this duplication is shown in the working example only at some points.

A common transmission line U2 is connected from central control means ZS1 to all operating matrix control means. It scans cyclicly and in succession, all operating matrix control means to determine in each case whether the criterion "reading", "writing" or "block"

is present. For this purpose each operating matrix control means has a connection system GA. An address receiver AE is assigned to this connection system GA. In order that, during scanning of the operating matrix control means by the central control means, always only one single operating matrix control means is connected, each connection is caused through the transmission of the address corresponding to the operating matrix control means in question from the central control means. (Under no circumstances should this address be confused with the addresses of the individual apparatus described in detail later.)

This address transmission from the central control means to an operating matrix control means for temporary connection of the latter to transmission line U2 can be carried out in different ways. It is possible to assign a separate address line to transmission line U2. The central control means transmits, for the duration required for connection, the address of the operating matrix control means in question. The beginning and end of the connection is determined in simple manner through the beginning and end of the address transmission over the address line.

It is also possible to transmit the address of the operating matrix control means in question which is to be connected to or disconnected from transmission line U2 over the latter. The address receiver of each operating matrix control means must thereby be permanently connected to transmission line U2. The connection and disconnection of the operating matrix control means through its connection system GA in this case is always caused, from the direction of the central control means, through the fact that the address of the operating matrix control means in question is transmitted with an additional criterion "connect" or "disconnect" unto the transmission line U2 from the direction of the central control means to all operating matrix control mechanisms. This connection guarantees that the addresses with the additional criterion in each case will not be confused with the remaining information to be transmitted over the transmission line U2 because only the connection system of the operating matrix control means in question reacts thereto in the desired manner.

If the connection or disconnection of an operating matrix control means to or from transmission line U2 is caused by the central control means, only the address receiver of the operating matrix control means in question reacts and opens or closes the coincidence gates, G16, G17, Gl8 and G19, of connection system GA.

The criteria "reading", "writing" and "block" are formed in program control AB of the operating matrix control means. The criterion "reading" is transmitted over output L of program control AB, and the criterion "writing" over output S of the program control. The criterion "block" resides in the fact that the criteria "reading" and "writing" are transmitted at the same time. It is, however, also possible to identify the criterion block by the absence of criteria "reading" and "writing", or to provide a third signal circuit therefor.

The criteria "reading", "writing" and "block" are offered to the central control means. When the central control means causes over connection system GA the connection of an operating matrix control means to transmission line U2, it always receives one of these three criteria. For the transmission of these criteria, special criteria lines can be assigned to transmission line U2. However, it is also possible to offer these criteria to the central control means over transmission line U2.

If in an operating matrix control means the "writing" signal is tpresent, there is thus transmitted a corresponding signal to the central control means as soon as the latter causes in already described manner the connection of the operating matrix control means over the connection system GA thereof. If the central control means has stored in its information storage means information to be transmitted to the operating matrix control means in question, it then carries out the transmission of such information to the said operating matrix control means in a manner described in more detail hereafter. However, if no such information is present, the central control means causes again in the manner described disconnection of the operating matrix control means from transmission line U2 by its connection system GA.

However, if in an operating matrix control means the "block" signal is present when the central control means causes the connection of this operating matrix control means, the central control means causes in the manner described the disconnection of the operating matrix control means in question, independently from the fact as to whether or not information to be transmitted from the central control means to the operating matrix control means is present.

However, if the "reading" signal is present in an operating matrix control means, it is also transmitted over gates G15 and G17 upon connection of the operating matrix control means to the central control means. Thereupon the central control means returns a criterion to the operating matrix control means which initiates transmission of the information in question from the operating matrix control means over transmission line U2 to the central control means. The information is transmitted in several segments. Each information segment is separately initiated and acknowledged by special criteria. This and the transmission of information in segments will be explained hereafter in more detail.

Each information is subdivided into several information segments. All information is preferably coded in binary code, i.e., the information transmitted over transmission lines U11 and U2 as well as the information temporarily stored in the operating matrix control means and recoded. Recoding in the operating matrix control means is for adapting information transmission on transmission lines of the first type, for example U11 in parallel code, to information transmission on the transmission line of the second type, U2, in series code. The information is transmitted on transmission lines of the first type with the aid of electromagnetic relays and on the transmission line of the second type with the aid of electronic switching devices, for example transistors. The high operating speed of the latter not only serves to decrease the transmission time on central transmission line U2 of the second type, but also makes possible information transmission in the mentioned series code, by reason of which only a few transmission channels are required. In contrast, over transmission lines of the first type, information is transmitted over multiconductor lines. As these extend only over relatively short distances, and pose no high costs in their multiconductor contruction due to information transmission by means of parallel code, suitable transmission times can also be achieved with electromagnetic relays, or equivalent switching devices that are favorably inexpensive.

Further, as transmission lines of the second type extend over relatively long distances, with the aid of a data transmission path, for example one encompassing the radius of a large city or of a junction exchange office area, series code transmission operating slower compared to parallel code transmission can be employed for information transmission due to the use of electronic transmission and receiving switching devices because the switching time of the latter is smaller by a factor of from four to five tenth powers than that of electromechanical relays. This permits limiting the cost of transmission lines U2 of the second type.

It has already been explained that the information is subdivided into several information segments, the transmission whereof is carried out in segments over the transmission line U2 of the second type with the aid of controlling criteria.

All subscriber information is transmitted simultaneously over the multi-conductor transmission line U11 to the operating matrix control means. Information storage means JS comprises a separate part for each of four information segments; JS1, JS2, JS3 and JS4. Further, command storage means BS provides a separate part for each of the four information segments; BS1, BS2, BS3 and BS4. The different designation of information storage means JS and command storage means BS also indicates that in one case the central control means has "readable" information, and in the other case "writable" commands. The definitions are retained in subsequent portions of the specification.

For transmission on transmission line U2, each information transmission consisting of several information segments, and each command consisting of several command segments is supplemented by a length specification and an address. (These are the addresses of individual apparatus; they should not be confused with the addresses of the operating matrix control means.)

Prior to an information or command transmission, the length data are first transmitted. It indicates the quantitative extent of the subsequently transmitted information or of the command. If the total contents thereof can be expressed by less than four information or command segments, the information or command transmission is limited to fewer information or command segments. Due to prior receipt of prior length data, the receiver in each case, i.e., the operating matrix control means or the central control means knows when the information or command transmission will be completed.

Further, an address indication precedes each such transmission. Thus, it is always specified beforehand from which individual apparatus an information emanates or for which individual apparatus a command is intended.

It has already been explained that information transmitted is divided into several information segments, with the largest number of such segments being limited to four. The address data immediately preceding the information segments on transmission line U2 may additionally comprise segments, the largest number thereof being limited to two. The length data preceding the address data maximally comprises one segment in the present working example.

The length data, the address data and the maximum of four information or command segments are temporarily stored in equally large groups of binary code elements in the operating matrix control means and recoded and transmitted therefrom or thereto; this recoding can be limited to a conversion parallel/series code or vice versa, and can, together with the intermediate storage form a single common process. The mentioned group of binary code elements is designated a byte. A first byte containing the data concerning length, a second and a third byte concerning the address data, and according to the present working example a maximum of four further bytes containing information or commands in each case jointly form a "word". The transmission of a word over transmission line U2 is controlled with the aid of auxiliary criteria. These auxiliary criteria are "reading" (L), "writing"(S), "block" (L+S), as already described, and "acknowledged" (Q).

It has already been indicated in what manner information to be read by the central control means is transmitted from an individual member, for example switching matrix control means ST1 to the operating matrix control means in FIG. 2. A request over request contact an precedes this transmission. Thereupon this request is identified with the aid of identification means Jd. The result thereof is the address of the individual apparatus ST1. This address is maintained available by identification means Jd for transmission to code converter CU1. It also excites, over a coordinate control matrix, connection relay Mo assigned to individual member ST1. With the aid of contact mo of the latter, transmission switching device *s*, as well as receiving switching device E of the individual apparatus ST1 are switched effective. Over a plurality of circuits of transmission line U11 the entire information present in the individual apparatus is offered, simultaneously, for example in a parallel code transmission process, to information storage means JS of the operating matrix control means. The information is received in partial storage means JS1 to JS4 of information storage means JS, whereupon the coupling group control means ST1 is again disconnected through release of relay Mo in question.

The information is divided, corresponding to storing in partial storage means JS1 to JS4 of the information storage means, into several bits. Together with the information there is also present the quantitative extent thereof in information storage means JS. The length data is offered to one of the two inputs of gate G4. The individual bits stored in information storage means JS are offered to one input each of gates G5, G6, G7 and G8. Gates G4 to G8 symbolically express here that the information placed at one of their inputs, mentioned in each case, can only be conveyed on when a corresponding signal is placed, in each case over the other input of the gate, for transmission. This signal is connected by distributor V, with the aid of its switching arm *v*, successively to the different gates G1 to G12, so that successively the individual bits can be transmitted; i.e., first the data as to length, then the address and then the information or the command.

Figure 4A:
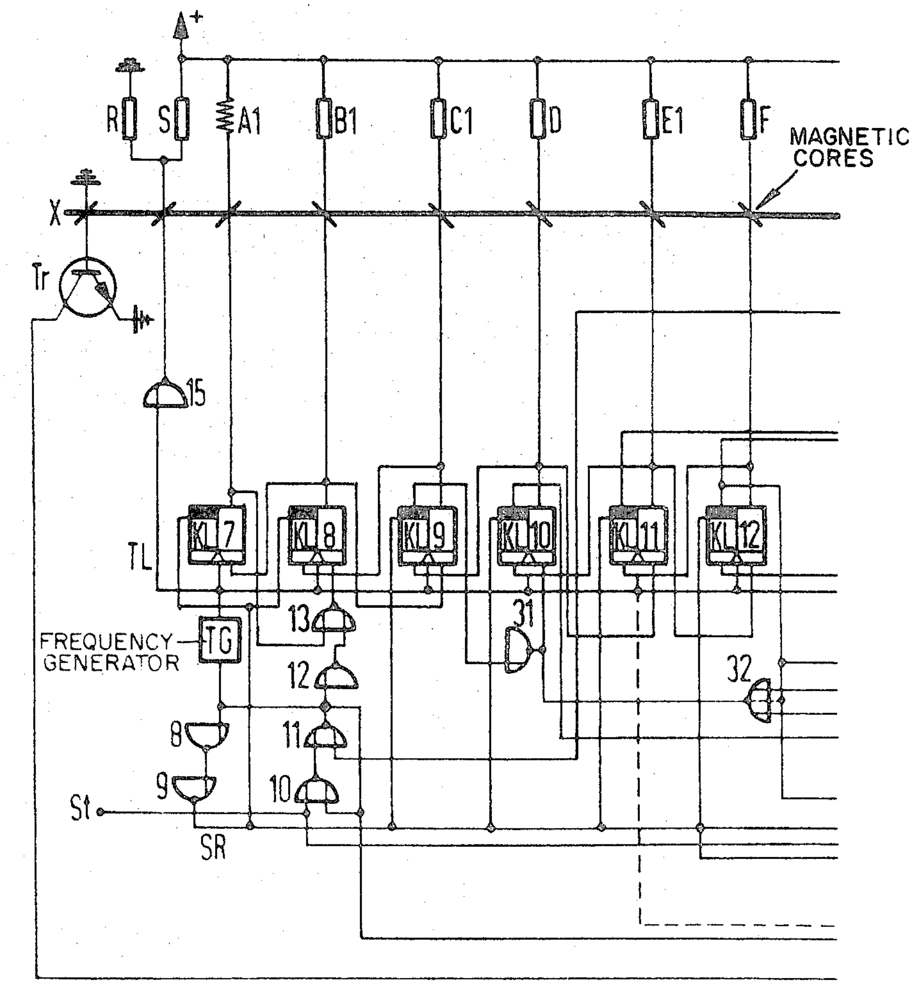
FIG. 4, consisting of FIGS. 4*a* and 4*b*, viewed together, is a schematic diagram of the internal circuitry of the program control in FIG. 2.
Figure 4B:
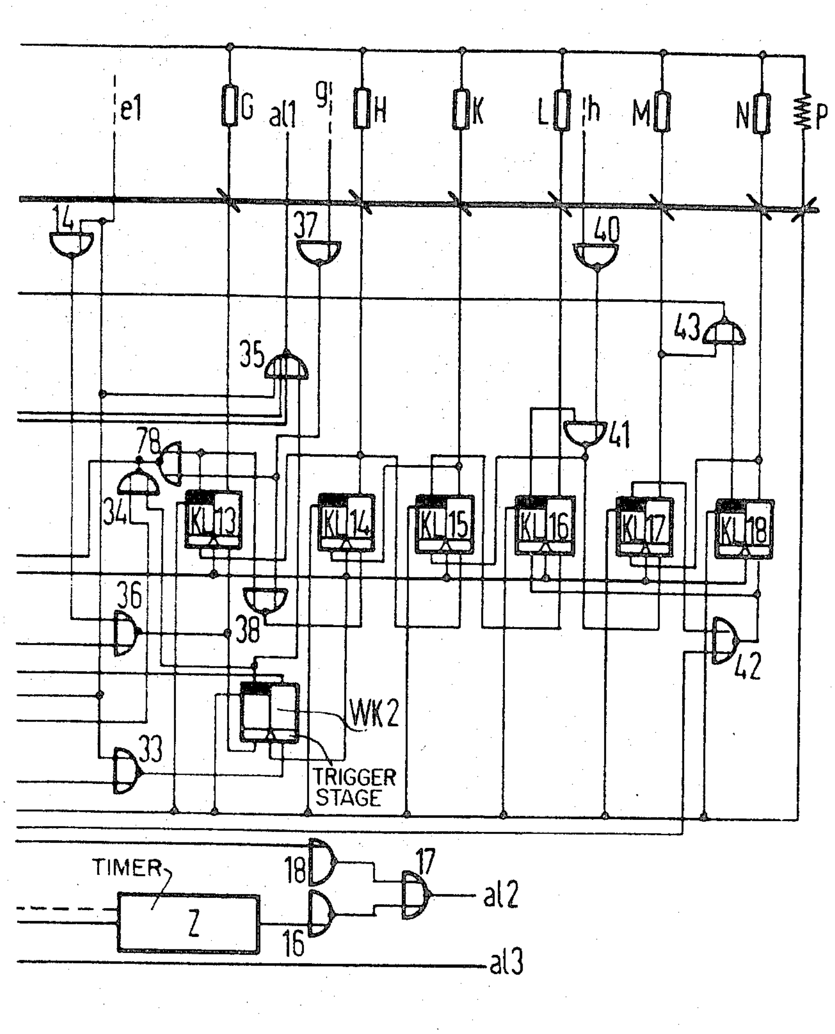

Before the further details of the switching arrangement according to FIG. 2, are explained, the program control AB will be described in detail. An exemplary construction of program control AB is illustrated in FIGS. 4*a* and 4*b*. A program control of the illustrated type comprises in its basic structure a shift register formed from bi-stable trigger stages KL7 through KL18. Therebeyond, the program control utilizes ordinary gating circuits. The program control further contains a time switching member Z with which the time requirements of the program control for each cycle of operation are monitored. A current measuring device is assigned to the operating control which monitors the consumption of current of the trigger stages during a cycle of operation of the program control. This current measuring device comprises principally the transistor Tr and the magnetic core X, which has a hysterisis loop exhibiting a square characteristic. The switching devices B1 through N, which may be diode switches, are under the switching influence of the program control all have the same internal resistance. They lie at plus voltage which in the usual manner is brought in over supply lines to each of the switching devices under the switching influence of the program control. At some of the switching devices B1 through N switching commands solely are given off. A receipt of the previously given switching command will be received by some of these switching devices, namely the switching devices E1, G and H. The circuits el, g and h serve to indicate receipt of such a switching command.

The gate circuits used in the program control are all NOR gates. The voltage potentials arising in the represented principal circuits are ground potential and positive potential. The switching commands will be given off by the trigger stages KL8 through KL18 in the form of ground potential to the switching devices B1 through N. All trigger stages are beat-controlled in the known manner. A beat generator TG delivers beat impulses over a beat line TL, common to all trigger stages. Each of the trigger stages has a rest position and a working position. The rest position will be designated in the following as "position 0" and the working position as "position 1." The position 0 and the position 1 each corresponds on each of the trigger stages to a preparation input. If ground potential is switched on at the preparation input of a trigger stage corresponding to position 0 early enough in the time between two beat impulses, then the trigger stage triggers to position 0, if it previously had taken position 1; otherwise, it remains in the position 0. The same holds for the position 1 of each of the trigger stages, which also are constructed completely symetrically. Each of the trigger stages has a corresponding output for the position 0 and one for the position 1. Depending on which of the two positions a trigger stage is in, ground potential is switched on to the output for the given stage by the trigger stage. The trigger stages have further an input for return position. These last mentioned inputs of all trigger stages are connected with the line SR for return. As long as the program control is at rest, plus potential is switched on over the output gate 9 onto the line SR. This potential has the effect that all trigger stages take the position 0.

The gate switches designated only with numbers give off plus potential over their outputs insofar as ground potential is applied to one or more of their inputs. They give off ground potential over their outputs only when plus potential is switched to all of their inputs. If different potentials from the outputs of different gates, for example, 31 and 32, meet at a switching point, then the ground potential always prevails.

A control operation is described below. A start inpulse in the form of ground potential will be given off over the terminal St on to the program control. The gate 10, on the two inputs of which a plus potential had existed and on the outputs of which consequently, ground potential had existed, now gives instead plus potential to the gate 11. Because the trigger stage KL18 takes the position 0, ground potential reaches one of the inputs of the gate 43, which as a result, gives off plus potential over its output to gate 11. This gate receives, then, plus potential over both of its inputs, so that it applies ground potential to its output. This ground potential reaches the other input of the gate 10. With the switching off of the input side of the terminal St, the two gates 10 and 11 retain their last given switching position. The ground potential given off from the gate 11 reaches further to the beat generator TG, which will be caused thereby to give off beat impulses over the beat line TL, common to all trigger stages. The mentioned ground potential reaches therebeyond to the inputs of the gate 8, at whose output plus potential now appears in place of ground potential. As a result, ground potential appears at the output of the gate 9, which, as is not shown in detail, is an output gate consequently, having a relatively large switching output (switching power) whereby all of the trigger stages will be set in position 0. The mentioned ground potential at the outputs of the gate 11 reaches finally also to the gate 12, at whose output the ground potential which until then had been applied there, will thereby be replaced by plus potential. Because plus potential had also been applied at gate 13 from the trigger stage KL7, ground potential now appears at its output in place of plus potential.

Through the above described switching process, the trigger KL8 is prepared to trigger from its position 0 to its position 1 at the next beat impulse. When this arrives over the beat line TL, ground potential will be switched on over its position 1 output to the switching device B1, as well as to the 1 input of the trigger stage KL7. Thereby the switching device B1 is the first to receive a switching command. During the period between the previous and the following beat impulse at the given inputs of the trigger stages KL7 and KL9 corresponding to position 1, these trigger stages will be prepared to switch to their position 1 at the occurrence of said following beat impulse. As soon as this beat impulse arrives, ground potential will be consequently switched on to the outputs of the trigger stages KL7 and KL9 corresponding to position 1. Thereby, circuits will be switched on over the resistance A1 and the switching device C1. The ground potential at the outputs of the trigger stage KL7 corresponding to the position 1, reaches further to the gate 13, which heretofore had received plus potential over its two inputs, and consequently, had given off ground potential over its outputs to the input of the trigger stage KL8 corresponding to position 1. Now, instead, it gives off plus potential.

The trigger stage KL8 receives from now on, instead of over its 1 inputs, ground potential over its 0 input from the output of the trigger stage KL9 corresponding to position 1. The trigger state KL8 is thereby prepared to trigger once again to its position 0 at the occurrence of the next beat impulse. The trigger stage KL7 in contrast remains in its position 1, until the entire program control returns to its rest position, where, as will be described later in detail, plus potential will be switched on to the line SR. With the event that the trigger stage KL9 has taken its position 1 as described, the ground potential which until then had been applied at the single input of the gate 31, was exchanged for plus potential. Consequently, the plus potential which until then had existed at the output of the gate 31 was replaced by ground potential. This prepared the trigger stage KL10 to trigger to its position 1 during said next beat impulse. When this beat impulse arrives, the trigger stage KL8 triggers back to its position 0, while in contrast the trigger stage KL10 triggers to its position 1. Thereby, the commands to the switching device B1 will be switched off, and instead, a command to the switching device D will be switched on. The command given to the switching device C remains switched on. The ground potential switched on to the output of the trigger stage KL10 corresponding to position 1 reaches the input of the trigger stage KL9 corresponding to position 0 and the input of the trigger stage KL11 corresponding to position 1. These two trigger stages are thereby prepared to trigger to their last named positions during the next beat impulse.

The two trigger stages KL9 and KL11 trigger during the next beat impulse to their last named positions. Therewith, the switching command given to the switching device C1 will be ended, and a switching command will be switched onto the switching device E1. The switching command given to the switching device D continues. Because the trigger stage KL9 triggers back to its position 0, ground potential will be given off over its output corresponding to this position, which ground potential goes to gate 31. As a result thereof, it changes its output signal from ground potential to plus voltage. The ground potential given off over the outputs of the trigger stage KL11 corresponding to stage 1 reaches not only to the switching device E1 as a switching command, but also to the input corresponding to position 0 of the trigger stage KL10, as well as, to the input of the same corresponding to position 1 of the trigger stage KL12. Thereby, the trigger stage KL10 will be triggered to its position 0 and the trigger stage KL12 will be triggered to its position 1 at the occurrence of the next beat impulse in the described manner. The switching command given to the switching device D will be ended therewith and a switching command will be given off to the switching device F.

The further switching processes can now proceed further in two ways, depending on whether or not receipt signal is given over the circuit e1. This receipt signal will be given by the switching device E1 when the switching command previously given over the trigger stage KL11 has been received in the switching device E1 and carried out. This receipt signal can also pertain to the two switching commands received by the switching devices D and E1. The receipt signal is positive, when ground potential is applied in a manner not shown over the circuit e1; in contrast, it is negative when plus potential is applied. Before the pertinent switching command is carried out - or the pertinent switching commands are carried out - plus potential lies at the input of the gate 14, and consequently, ground lies at its output. The former reaches the gates 32, 33 and 35. In addition, before the trigger stage KL12 has taken its position 1, ground potential reaches the three named gates over others of their inputs, so that they give off plus potential over their outputs.

Next the case will be considered in which switching device E1, after receiving the switching command given to it, carries out the command without delay and transmits back to the program control a positive receipt signal over the circuit e1. This can occur in the beat period immediately before or after the described triggering of the trigger stage KL12. As previously explained, this receipt signal consists of the switching on of ground potential instead of plus potential over the circuit e1. This ground potential reaches the gates 32, 33 and 35. The ground potential applied to the circuit 31 as a positive receipt signal reaches, in addition, the inputs of the gate 14, at the output of which plus potential now appears in place of ground potential. The latter plus potential reaches an input of gate 36. If now, as described, the trigger stage KL12 triggers from its position 0 to its position 1, plus potential will appear in place of ground potential at its output corresponding to position 0. Therewith, plus potential lies at both inputs of the gate 36 and consequently, ground potential lies at its output. This reaches the input of the trigger stage KL13 corresponding to position 1. Further, it is to be noted that the ground potential from the ground output of the trigger stage KL12 corresponding to position 1 reaches the input of the trigger stage KL11 corresponding to position 0.

When the next beat impulse now arrives over the beat line TL, the trigger stage KL11 will be triggered to its position 0, and the trigger stage KL12 will be triggered to its position 1. The switching command given off to the switching device E1 will be thereby ended, and a switching command will given off to the switching device G. The ground potential given off by the gate 36 reaches, in addition, the input of the trigger stage WK2 corresponding to position 0. Because this trigger stage already is in the position 0, the last named potential can accomplish nothing in this case. Further, because ground potential is applied to one of the inputs of each of the gates 32, 33 and 35 over the circuit e1, plus potential lies on the outputs of the three named gates, and this plus potential releases no switching process.

The case will be considered in which the switching command given to the switching device E1 is not carried out in order thereby (by the switching device). Thus, no positive receipt signal arrives over the circuit e1, but rather ground potential remains thereafter switched to this circuit. This leads, as will be hereafter described, to the result that the switching commands given off to the switching devices D, E1 and F will be repeated a single time, and insofar as the expected receipt signal still remains on the circuit e1, an alarm signal will be given off over the gate 35 to the circuit all.

We will now proceed from the assumption that the trigger stages KL7 and KL12 have taken their position 1 and that a positive potential remains switched on to the circuit *e*. The latter will be transformed to ground potential by gate 14. The latter potential reaches, among other things, the gate 36, at the other input of which a positive potential is applied from the trigger stage KL12. Consequently, plus potential is also applied thereafter, at the output of the gate 36 as before, so that the trigger stage KL13 cannot trigger, as previously described, from its position 0 to its position 1, at the occurrence of the next following beat impulse. The plus potential from the circuit e1 reaches the gates 32 and 33. Because the trigger stage KL12 is triggered from its position 0 to its position 1, plus potential is applied to its output corresponding to position 0, instead of ground potential. Thereby, plus potential is applied to both inputs of gate 33 and to all three inputs of the gate 32 (trigger stage WK2 is not yet triggered from its position 0 to its position 1), so that ground potential appears from then on at their outputs instead of plus potential. Thereby, the trigger stages KL10 and WK2 will be prepared to trigger from their position 0 to their position 1 at the occurrence of the next following beat impulse. At the occurrence of the same beat impulse the trigger stage KL11 triggers back from its position 1 to its position 0. Thereby, the switching command given off to the switching device E1 will be switched off, and the switching command to the switching device D will be switched on for the second time. Because, with the exception of the trigger stage KL12, the two trigger stages KL10 and WK2 now take their position 1, plus potential lies at the two inputs of the gate 34, and ground potential lies at its output. This ground potential reaches the input corresponding to the position 0 of the trigger stage KL12. Further, the ground potential from the output corresponding to the position 1 of the trigger stage KL10 is applied to the 1 input of the trigger stage KL11. At the occurrence of the next beat impulse, the trigger stage KL12 will consequently be triggered to its position 0 and the trigger stage KL11 will consequently, be triggered to its position 1. Thereby, the switching command given off to the switching device F will be ended, and the switching command to the switching device E1 will be switched on for the second time. At the occurrence of the following beat impulse, the trigger stage KL10 triggers back to its position 0, and the trigger stage KL12 triggers to its position 1, as described. Thereby, the switching command given off for the second time to the switching device D will be ended, and the switching command to the switching device F will be switched on for the second time.

The special development of the described switching arrangement proceeds from the assumption that the switching commands given off for the first time to the switching device E may have been lost because of some unfavorable spurious condition. It is assumed that these conditions occur relatively infrequently and do not result from an error arising in the switching arrangement, but rather from a short time disturbance. Insofar as the loss of the switching command does pertain to such a disturbance, it is to be expected that the disturbance will not arise again when the switching command is given the second time, because it is very unlikely that the same disturbing influence which arises very seldom, will occur twice by chance successively and concurrently with the beat impulse. It is, however, assumed that when the switching command given off twice to the switching device E1, in addition to the one switching command to the switching device D the one switching command to the switching device F1, is not received over the circuit e1 in the described manner. In such case, a switching error has arisen in the program control.

It is now assumed that this receipt signal also remains outstanding in this case. The trigger stages KL11 and KL12 have taken their position 1. The trigger stage WK2 is also to be found in its position 1, whereby it is recorded that a one-time repetition of the switching commands given off to the switching devices E, E1 and F has taken place. A positive potential will be applied from the three last named trigger stages to the three corresponding inputs of the gate 35.

Because, as a consequence of the fact that the receipt signal expected over the circuit e1 remains outstanding, a plus potential remains on the circuit e1. This causes a plus potential to occur at all of the inputs of the gate 35, as soon as the trigger stage KL12 is triggered, as described, from its position 0 to its position 1. As a consequence thereof, at this point of the switching process, the plus potential which until then had been applied to the outputs of the gate 35 will be exchanged for ground potential. This change in potential releases an alarm signal over the circuit a11, which indicates, that the control operation was interrupted because the receipt signal which confirms the carrying out of a switching command or of switching commands has remained outstanding over the circuit e1. Therewith, the further release of commands will also be interrupted, as will be explained hereafter.

As soon as the trigger stage KL12 is triggered from its position 0 to its position 1, plus potential lies also at both inputs of the gate 33 and consequently, ground potential lies at its output. This achieves, however, nothing in the trigger stage WK2, because this stage is already triggered to its position 1. In the same way, plus potential lies also at two of the three inputs of gate 32; however, ground potential from the output of the trigger stage WK2 corresponding to position 1 lies at the third input of gate 32. Thereby, the plus potential at the output of gate 32 cannot be switched for ground potential at this point in the switching. The switching commands for the switching devices D, E1 and F cannot, therefore, be repeated.

By disconnecting the output corresponding to position 1 of the trigger stage WK2 and the one input of the gate 32, it can be achieved the presence of an error, that the switching commands for the switching device D, E1 and F are continually repeated in the previously described manner. For this case, it is provided that over the circuit a11 a subsequent evaluation of these switching commands in the switching devices D, E1 and F will be cut off. Because the trigger stage KL10, KL11 and KL12 trigger in a continually repeating cycle, the error which has arisen can be easily determined with the assistance of known measuring devices, for example, an oscillograph.

In contrast to the previously described processes, we now proceed from the assumption that after a one time repetition of a switching command to the switching devices D, E1, the expected receipt signal arrives over the circuit e1, which consists, as described, of a switch from plus potential to ground potential. The latter reaches, among other things, to an input of the gate 35 and prevents there the giving off of the alarm signal over the circuit a11 at the triggering of the trigger stage KL12 from its position 0 to its position 1. The ground potential reaches, in addition, the gates 32 and 33 and prevents the ground potential from being given off by these gates over their outputs. The receipt signal given in the form of ground potential over the circuit e1 reaches also to the gate 14 and is transformed by gate 14, into plus potential, which is given to gate 36. As soon as the trigger stage KL12 triggers from its position 0 to its position 1, plus potential appears at the trigger stage KL12 output corresponding to position 0 in place of ground potential, which plus potential also reaches the gate 36. At the gate 36 output, as a consequence, the plus potential applied there until then will be switched to ground potential. This reaches the inputs of the trigger stage WK2 corresponding to position 0 and to the input of the trigger stage KL13, corresponding to position 1. When the next beat impulse now arrives, the trigger stage KL13 triggers from its position 0 to its position 1, and the trigger stage WK2 triggers from its position 1 to its position 0. In the same way, the trigger stage KL11 triggers back from its position 1 to its position 0, as already described. A switching command will now be given off to the switching device G.

The reaction time of the switching device G is, as a rule, smaller than the time difference between two beat impulses; it can, however, in exceptional cases, be even larger. Therefore, the further continuation of the switching of the program control is brought into switching dependence on a receipt signal on the side of the switching device G.

It is, however, in contrast to the above explanations, also possible to utilize the circuit *g*, as well as the circuit *h*, to bring the release of the series of commands given by the program control, additionally into switching dependence on external criteria. If one proceeds from the assumption that an external signal should influence the release of commands over the circuit *g*, then the giving off of the switching commands for the switching devices H through N must depend on the event that said signals previously arrives over the circuit *g*. Through appropriate supplementation of the present switching arrangement, it is also easily possible for the professional to bring the continuation of the release of commands into switching dependence on external signals at chosen points of the operation control.

Because the trigger stage KL13 is triggered from its position 0 to its position 1, plus potential from its output corresponding to position 0 lies at the gates 78 and 38. If one or more beat impulses arrive over the beat line TL, before the receipt signal, or external signal, has arrived over the circuit *g*, on which until then plus potential exists, then the ground potential from the outputs of gate 37 lies at the other inputs of the gates 78 and 38. At the two outputs (the outputs of gates 78 and 38) there occurs, thereafter, plus potential as it did before, which leaves the trigger stages KL12 and KL14 uninfluenced. As soon as the receipt signal (ground potential), which is expected over the circuit *g*, arrives, plus potential will be applied from gate 37 to the inputs of the gates 78 and 38 in place of ground potential, so that these gates, for their part, apply ground potential on the one hand to the input corresponding to position 0 of the trigger stage KL12 and on the other hand to the input corresponding to position 1 of the trigger stage KL14. These two trigger stages are, thereby, prepared for a reaction to the next beat impulse. As soon as this beat impulse arrives, the trigger stage KL12 triggers from its position 1 to its position 0, and the trigger stage KL14 triggers from its position 0 to its position 1. The switching command given off to the switching device F will be, thereby, ended, and a switching command will be given off to the switching device.

The further continued switching of the trigger stages occurs in the same manner as has been described already for the trigger stages KL10/KL11 and KL11/KL12. If the two trigger stages KL15 and KL16 have taken their position 1, then the next beat impulse and also further beat impulses can become functional, when a receipt signal or, as previously described with reference to circuit *g*, an external switching signal appears over the circuit *h*. The switching device H must also have reacted to the switching command given to it before a switching command may be given off to the switching device M. If, now a beat impulse arrives, before the receipt signal expected over the circuit *h*, is present, then ground potential lies once again, thereafter, as it did before, at the output of the gate 40. In spite of the fact that plus potential from the output corresponding to position 0 of the trigger stage KL16, is applied to an input of gate 41, no ground potential can appear immediately thereafter, at its output, because at its input connected with the output of gate 40, ground potential is still applied. As soon as, however, the receipt signal in the form of ground potential in place of plus potential arrives over the circuit *h*, then also at the output of the gate 41, the plus potential, which has until then been applied there, will be switched for ground potential, which reaches the trigger stages KL15 and KL17. The former triggers to its position 0 and the latter triggers to its position 1. A switching command given off to the switching device K will, thereby, be ended and a switching command to the switching device M will be given off.

The plus potential released from the output of the trigger stage KL17 corresponding to position 0 (in place of ground potential) reaches an input of gate 42. From the output of gate 42, ground potential for the preparation on the one hand for the return positioning of the trigger stage KL16 from the position 1 to the position 0 and on the other hand, for the engagement of the trigger stage KL18 from its position 0 in the position 1 can then be given off, when a start signal received over the terminal St in the form of ground potential is ended. Until then, further arriving beat impulses can achieve nothing at the trigger stages KL16 and KL18. However, as soon as the start signal is ended, the trigger stage KL16 will be triggered into position 0, and the trigger stage KL18 will be triggered to its position 1. Therewith, the switching command given off to the switching device L will be ended, and a switching command will be given to the switching device N. This last mentioned switching command is the last of the switching commands. It represents the programming command.

The ground potential switched on over the output of the trigger stage KL18 corresponding to position 1 reaches the inputs of the trigger stage KL17 corresponding to position 0. As soon as the next beat impulse arrives, the last named trigger stage triggers back to its position 0. From there on, plus potential reaches both inputs of gate 43. As a consequence thereof, gate 43 gives off ground potential over its output, which reaches an input of the gate 11. The ground potential lying at the output of the gate 11 during the previously described switching processes will be switched to plus potential. This plus potential reaches an input of gate 10, on the output of which ground potential appears in place of plus potential. The last given switching condition of the gate 11 will be retained, as a consequence thereof, independently of gate 43. The input of the gate 11 connected with the output of the gate 10 will once again be brought under the switching influence of the terminal St, over which a next start signal can be received. The plus potential given off over the output of the gate 11 at the last mentioned point in time of the switching process reaches, in addition, the input of the gate 12, at the output of which the plus potential, which until then had been applied there, will be switched to ground potential. Thereby, the plus potential will be made to remain at the output of gate 13 until the arrival of the next start signal. In spite of the fact, as will be hereafter described, that the trigger stage KL7 triggers back from its position 1, to its position 0, over its (KL7) output corresponding to the position 1, plus potential reaches the other input of gate 13.

The plus potential given off from the gate 11 reaches further to the gate 8, which as a result, gives off to the gate 9, which is connected thereto, ground potential. The gate 9, constructed as an output gate (power gate), now gives off over its output plus potential in place of ground potential to the line SR. This line is provided for the return of all trigger stages to their position 0. As soon as plus potential is applied to it (line SR), the trigger stages KL7 and KL18, which at this point of the switching still had taken the position 1, trigger back to their position 0. Therewith, the current flowing over the resistance A1 and the current flowing over the switching device N will be switched off. Further, the current flowing over the resistance B will be switched off, as soon as the ground potential at the outputs of the gate 9 is switched to plus potential.

Upon the termination of operation of the program control AB, the ground potential, which was heretofore applied to the output of gate 11 will be switched to a positive potential, and the beat generator TG will be switched off, which ends its transmission of beat impulses over the beat line TL.

The program control AB has been described in detail hereinabove, in conjunction with FIGS. **4*a* and 4*b*, and it is now necessary to correlate that description with the diagrammatic representation in FIG. 2.**

As was explained with reference to the FIGS. **4*a* and 4*b*, a series of switching devices are activated by the program control shown herein, which switching devices are designated with the letters B1 through N. Further, the switching arrangement shown in the FIGS. 4*a* and 4*b*** has a terminal St, over which the aforementioned switching arrangement receives a start impulse, whereby the cycle of a control operation will be commenced.

The program control shown in the FIGS. 4a and 4b operates as described above to perform the necessary control operations for either reading or writing. Hereafter, reference will be made to a reading operation. The description given below for a reading process is equally applicable to writing, so that the process for writing need not be described as well. The program control according to FIGS. **4*a* and 4*b* for reading is connected in FIG. 2, with the similarly designated connections. The control operation for reading (information transmission from the individual apparatus to the central control unit) is commenced by a signal introduced over the coincidence gate G20 (FIG. 2**) so that (*a*). an identification and switching on process (see above) is effected, (*b*). an information is present in storage in the information memory JS, (*c*). the central control unit has brought about the switching of the pertinent operating matrix control unit on to the transmission line U2 of the second type (over AE in FIG. 2) and (*d*). The "write" signal is not present in program control AB in FIG. 2.

The program control AB shown in FIG. 2 has, in addition, a bi-stable trigger stage L for the formation of the read signal and a second bi-stable trigger stage S for the formation of the write signal. These two bi-stable trigger stages, which may be of conventional construction, have a common return device, not designated, having an input M. The two bi-stable trigger stages have inputs E1 and G. Each of these two trigger stages react as follows: If it receives a signal over its given input, for example E1, then it gives off a signal corresponding to the stage function, for example, read. If a signal is given off over the input M, then the read and/or the write signal will be erased.

The program control AB, shown in FIG. 2, has in addition, two connections H and *h*, over which it is connected with the distributor V. If the operating control AB gives a signal to the distributor V over the connection H, then the switching arm *v* will be advanced by one step over its winding W in the previously described manner. The advancement of one step will be indicated over the connection *h* to the operation control AB by the distributor V with the assistance of the contact *w*.

In the following detailed plan, the control operation during the process of reading will be given.

1. Identification process ended (Jd); length indication present (JS); switching on of the operating matrix control unit carried out on the part of the central control unit; write signal(s) is not present.
2. Program control produces signal on E1.
3. Trigger stage L gives off the read signal (over G15, G17 and U2 to the central control unit).
4. Central control unit receives read signal.
5. Central control unit reads (JS, G4, G13, G18 and U2) the length indication.
6. Central control unit transmits back receipt signal (over U2, G16, G21 and Q).
7. Program control AB (compare FIGS. 4a and 4b) transmits signal to switching device G.
8. Program control AB (FIG. 2) forms the write signal and supplements the previous read signal to the common block signal.
9. Central control unit receives (over G15, G17 and U2) block signal.
10. Central control unit ends receipt signal.
11. Operation control AB transmits the signal over connection H, i.e., the further switching impulse for the distributor V.
12. Distributor V receipts the switching advance over contact *w* and connection *h*.
13. The program control according to FIGS. **4*a* and 4*b*** returns to its beginning position; the cycle begins anew at 1.

Returning to FIG. 2, distributor V is controlled by program control AB. From this program control the "writing" signal (S) is offered, in rest position, to the central control means over gates G15 and G17. As has already been explained, this means with respect to the central control means that the operating matrix control means is ready to receive a command from the central control means. However, if the operating matrix control means was requested by one of the individual apparatus, then as soon as the length data and the address and information are present, stored and ready to be transmitted in the operating matrix control means, corresponding criteria are transmitted to program control AB which cause it to offer the criterion "reading" over gates G15 and G17 to the central control means. If this causes, in its connection cycle, the connection system GA of the operating matrix control means in question to connect this to transmission line U2, the central control means receives first the criterion "reading" (L), of the individual apparatus in question.

Thus, the central control means is to receive information from the just connected operating matrix control means. As soon as the central control means is ready to receive, through connection to a free storage line in the central information storage means ZS, it receives the length data, which is already offered by the operating matrix control means on transmission line U2. It is pointed out here that gate G4 of the operating matrix control means was already enabled or opened for transmission of the length data as soon as the program control AB had ascertained that the length data and the address and information segments were present, stored, and ready for transmission in the operating control means. Thus, the length data is already present on transmission line U2 when the central control means has caused connection of the operating matrix control means with the aid of connection system GA.

The central control means receives the length data transmitted from the operating matrix control means over transmission line U2. As soon as it has received it, it transmits the "acknowledged" signal (Q) over transmission line U2 or over a separate criterion line to the operating matrix control means. This signal arrives in program control AB (Q). Thereupon, program control AB transmits, in the already described manner, the "block" signal to the central control means.

Thereupon, the program control AB transmits a switch-forward pulse to distributor V. This switches the distributor switching arm *v* forward by one step. Thereby, gate G4 is blocked for transmission of the length data, and gate G1 is enabled or opened for transmission of the address from identification means JD to code converter CU1. As soon as this switching forward is completed, the program control AB disconnects the criterion "block" and connects criterion "reading." This causes the central control means to receive the address data conveyed over gates G1, G13 and G18 unto transmission line U2. As soon as this has taken place, the central control means transmits over the transmission line U2 an acknoledgment through open gate G16 to program control AB. The central control means has received the address. As has already been explained, the address can be transmitted in the form of one or two bytes.

Referring to FIG. 3, a word (in the sense of the above given definition) is comprised of a byte containing the length indication, which gives the length of the information to be received in the central control device ZS1 over the transmission line, further bytes, which contain the address of the given individual apparatus, and a maximum of four additional bytes for the actual information. A shift register SR is provided in the central control devices ZS1 for each byte, and is illustrated in FIG. 3, as a part bounded by heavy lines. Each such part has a multiplicity of storage elements, the exact number of which is not important to this description. Each of these parts bounded by heavy lines of the shift register SR serves to receive one byte.

A word received in the shift register SR will have prefixed to it, in a manner not shown in detail, the address designating the given operating matrix control device. After reception of a word, its parts are taken up in the corresponding parts of the shift register, SR, according to the labeling in FIG. 3. A word received in the shift register SR will, as well, be passed on to the central information memory ZJS. At this point, a part of the address of the individual apparatus, and indeed, that part, which designates the address group and which designates the given address of the individual apparatus, i.e., its special type, will be evaluated therewith, for deriving the pertinent information. FIG. 3 shows, with reference to the wiring of the inputs of the coincidence gates Gt1 and Gt2, that two identical data signals given off by the shift register SR, because of different addresses indicating type, arrive at different individual apparatus as distinguishable information over the outputs of the two coincident gates. The inputs of the coincidence gates Gt1 and Gt2 are, respectively, connected to a combination of the same outputs of those storage elements of the shift register SR, which receive the information bits of the given word. Further inputs of the coincidence gates Gt1 and Gt2 are, respectively, connected to two different combinations of outputs of those storage elements of the shift register, which receive the parts of the address of the individual apparatus which designates the address group, i.e., the special type of the given individual apparatus. With the transmission of a word from the shift register SR too the central information memory ZJS the address of the operating matrix control device, the length indication, and the entire address of the individual apparatus will be written unchanged in a memory row of the central information memory. With the transmission of the pertinent information of the given word from the shift register to the central information memory the origin of this information will, however, be evaluated therewith. Identical data signals will be evaluated using the coincidence gates Gt1 and Gt2 as different pieces of information, according to which type of individual apparatus an information came from. Thus, the central control unit is able to interpret information signals by analyzing the address from which that information came.

The information segments are transmitted in the same manner after the address, in the form of further bytes from the operating matrix control means towards the central control means. The length data was stored previously in distributor V. Therefore, the regular end of information transmission can be determined in the operating matrix control means. As the length data was transmitted to the central control means, the same is also true for the central control means.

After receipt of the last information segment of a word, the central control means returns for the last time the criterion "acknowledged" to the program control of the operating matrix control means. As due to the transmission of the length data in the beginning, the quantitative extent of the information to be transmitted was stored in the operating matrix control means as well as in the central control means, it is possible in simple manner, to supervise the proper course of information transmission. If, after transmission of one of the information segments, no acknowledgment signal is transmitted from the central control means to the operating matrix control means, the latter sounds an alarm in a manner not shown after a predetermined time period has elapsed. An alarm is also sounded if the central control means, instead of the expected criterion "reading," receives the criterion "writing" or "block" without having already received the number of information segments which was indicated by the length data. In one of the two preceding cases, the central control means requested not enough information, and in the other case, not enough information was offered to the central control means.

Commands are transmitted from the central control means to operating matrix control means in the same manner as information. It has already been outlined that an operating matrix control means which is ready to receive commands keeps available the criterion "writing" at gate G17, over gate G15. As soon as the central control means causes, in the manner already described over connection system GA, the operating matrix control means to connect to transmission line U2, it receives the criterion "writing" (S). It is assumed that it has stored a command destined for the operating matrix control means. The central control means now transmits over gate G16 the acknowledgment signal (Q) to program control AB of the operating matrix control means. The program control AB as a consequence causes, in a manner not shown, over distributor V gate G3 to be switched open to pass the first bit expected from the central control means over gates G19 and G14. This first bit again contains the length data which is received by distributor V and stored. It, thereby, knows after how many switchings forward of its switching arm v, the command transmission is concluded.

As soon as the program control AB has received the criterion "acknowledged," it disconnects the criterion "writing." First, the operating matrix control means processes the length data, thereupon, it conveys a switch forward pulse to distributor V which, as a consequence thereof, switches its switching arm v forward by one step. Thereupon, the program control AB again connects the criterion "writing". The last mentioned criterion causes the central control means to now transmit the address of that individual apparatus for which the subsequent information is intended, instead of the length data, over the transmission line U2 to the operating matrix control means. In addition, the central control means transmits the criterion "acknowledged" to program control AB of the operating matrix control means whereupon this, in a manner not shown, causes over distributor V gate G2 to be switched open to pass the second byte expected from the central control means over gates G19 and G14. This byte which contains the address of that individual apparatus for which the subsequent information is intended or a portion thereof, is received over code converter CU2 and transmitted over gate G2 to identification means Id. It is, thereby, converted by code converter CU2. Identification means Jd causes over the coordinate control matrix, the connection of the connection relay, for example Mo, of that individual apparatus (ST1) designated by the address.

There are now successively received in the same manner, with the aid of the criteria "writing," and "acknowledgment," the bytes containing the command to be transmitted. These are passed over gates G9 to G12 and received in partial storage means BS1, BS2, BS3 and BS4 of command storage means BS, and stored therein temporarily. Thereafter the central control means causes in the already described manner the operating matrix control means in question to again be disconnected by connection system GA from transmission line U2.

The command stored in command storage means BS is transmitted over a plurality of circuits of transmission line U11, in a parallel code transmission, to receiving switching devices E of individual apparatus ST1. Relay E represents one of many receiving relays provided.

The code converter CU1 or CU2 for a byte pertaining to information or command, in each case containing the address, comprises in conjunction with identification means Jd, the storage and code conversion system introductorily mentioned here. With regard to the further bytes of a word which contain the information or the command, information storage means JS or command storage means BS represent this storage and code conversion system. The recoding can be limited to a conversion parallel-series code and vice versa, and can form together with the intermediate storage a single common process. Code converters CU1 and CU2 contain on their sides facing connection system GA, electronic transmission and receiving switching devices. The same is true for information storage means JS and command storage means BS.

The preferred embodiment of the invention described hereinabove is only exemplary of the principles of the invention. The scope of the invention is defined by the appended claims, and it is anticipated that many modifications and changes may be made to the preferred embodiment within the scope of the appended claims.

We claim:

1. A circuit arrangement for centrally controlled telecommunication exchange installations having central information transmission circuits interposed between central control means and centrally controlled individual apparatuses, and wherein connection of the centrally controlled individual apparatuses to the information transmission circuits is jointly controlled, comprising:

connection control means common to a plurality of centrally controlled individual apparatuses assigned thereto and interposed between said central control means and the centrally controlled individual apparatuses to constitute, along with interconnecting transmission lines, said information transmission circuits, address and information transmission and receiving means each of which is adapted to be assigned to a first transmission line segment of said information transmission circuits connected between said central control means and said connection control means common to the centrally controlled individual apparatuses, said first line segment being connected to be able to transmit information jointly with the one address of that centrally controlled individual apparatus with which an information exchange is taking place, a second line segment of the information transmission circuits connected between said connection control means and said centrally controlled individual apparatuses, said individual apparatuses being spatially arranged in a series relationship along said second line segment, each said individual apparatus having switching means for electrically connecting the individual apparatus to said second line segment, so that the individual apparatuses are electrically connectable to said second line segment in a parallel relationship one with the other, and connection circuits for operating said switching means and establishing the connection of centrally controlled individual apparatuses to the information transmission circuits under the control of the connection control means corresponding to the transmitted address, each connection circuit being connected only between the connection control means and a centrally controlled individual apparatus.

2. The circuit arrangement defined in claim 1, wherein said connection control means comprises:

storage means for information to be transmitted from the centrally controlled individual apparatuses to the central control means and for information to be transmitted from the central control means to the centrally controlled individual apparatuses.

3. The circuit arrangement defined in claim 1, wherein several spatially combined groups of centrally controlled individual apparatuses are formed having one individual connection control means for each group, each of said connection control means being connected with a common central control means.

* * * * *